United States Patent [19]

Pugh et al.

[11] 4,286,152

[45] Aug. 25, 1981

[54] COLLECTION SHIELD FOR ION SEPARATION APPARATUS

[75] Inventors: Ralph A. Pugh; Kenneth L. Ford, both of Richland, Wash.

[73] Assignee: Jersey Nuclear-Avco Isotopes, Inc., Bellevue, Wash.

[21] Appl. No.: 98,803

[22] Filed: Nov. 29, 1979

[51] Int. Cl.[3] ....................... H01J 39/34; B01D 59/44

[52] U.S. Cl. ................................ 250/281; 250/423 P; 250/515

[58] Field of Search .................... 250/423 P, 281, 282, 250/283, 284, 515; 423/2

[56] References Cited

U.S. PATENT DOCUMENTS

| | | | |
|---|---|---|---|
| 3,940,615 | 2/1976 | Kantrowitz | 250/423 P |
| 3,955,090 | 5/1976 | Astley et al. | 250/423 P |
| 4,063,090 | 12/1977 | Bernhardt | 250/423 P |

*Primary Examiner*—Bruce C. Anderson
*Attorney, Agent, or Firm*—Weingarten, Maxham & Schurgin

[57] ABSTRACT

The ion separation electrodes in isotope separation apparatus are provided with removable collection shields to collect neutral particles which would normally pass through the ionization region. A preferred collection shield comprises a U-shaped section for clipping onto the leading edge of an electrode and a pair of flanges projecting substantially perpendicular to the clipping section for collecting neutral particles.

8 Claims, 5 Drawing Figures

COLLECTION SHIELD FOR ION SEPARATION APPARATUS

FIELD OF THE INVENTION

This invention relates to improved apparatus for isotope separation of the type comprising means for effecting isotopically selective photoionization in an ionization region and a plurality of ion separation electrodes adjacent the ionization region for separating the selectively ionized particles from neutral particles. Removable collection shields placed on the leading edges of the ion separation electrodes collect neutral particles which would normally pass unexposed through the ionization region and thereby produce an appreciable savings of enriched material. A preferred collection shield comprises a U-shaped section for clipping onto the leading edge of the electrode and a pair of tranvsverse flanges for collecting neutral particles.

BACKGROUND OF THE INVENTION

A promising new technique for efficient enrichment of an isotopic mixture, such as $U_{235}$ enrichment of uranium, involves exposing a vapor of the mixture to carefully chosen bandwidths of laser radiation for selectively photoionizing the desired isotope. Ions of the desired isotope are then separated from the neutral particles by the application of strong electric and/or magnetic fields in accordance with magnetohydrodynamic techniques.

Apparatus for effecting such separation typically comprises a source for emitting neutral particles of the isotopic mixture in a generally defined direction, and a plurality of spaced apart ion separation electrodes having relatively large area surfaces oriented generally parallel to the direction of neutral particle emission and elongated surfaces of relatively narrow width substantially perpendicular to such direction. The latter surfaces can be referred to as the leading edges of the electrodes.

As neutral particles pass through ionization regions between spaced apart electrode pairs, they are subjected to isotopically selective photoionizing radiation from carefully tuned lasers. Ions of the selected isotope are separated from neutral particles in the resulting plasma by simultaneously applying a voltage differential between the electrodes and magnetic field perpendicular to the electrical field. The positive ions of the selected isotope collect on the negative electrodes for removal and further processing while the neutral particles deposit onto a "tailings" plate downstream.

One difficulty in the operation of such apparatus arises because the photoionizing radiation, for a variety of practical reasons, does not fill the entire space between the electrodes. Consequently the neutral vapor passing through the unexposed space mixes with the exposed but unionized vapor (depleted vapor) at a "tailings" plate. Such mixture represents a loss in enrichment as the unexposed neutral vapor will have a greater enrichment than the exposed depleted vapor.

In addition, there is a tendency for the leading edges of the ion separation electrodes to collect large deposits of the neutral particle vapor. Such deposits reduce the level of enrichment of material collected on the negative electrodes and require periodic cleaning of the positive electrodes.

SUMMARY OF THE INVENTION

The present inventors have recognized that a removable collection shield placed on the ion separation electrodes to collect neutral particles which would normally pass unexposed through the ionization region can result in an appreciable savings of enriched material. A preferred collection shield comprises a U-shaped section for clipping onto the leading edge of an electrode and a pair of flanges projecting substantially perpendicular to the clipping section for collecting neutral particles. Preferred materials for the shield are titanium and molybdenum.

BRIEF DESCRIPTION OF THE DRAWINGS

The nature, advantages, and various additional features of the invention will appear more fully upon consideration of the illustrative embodiments now to be described in detail in connection with the accompanying drawings.

In the drawings.

For convenience of reference the same structural elements are designated by the same reference numerals throughout the drawing.

DETAILED DESCRIPTION OF THE INVENTION

Figure 1:
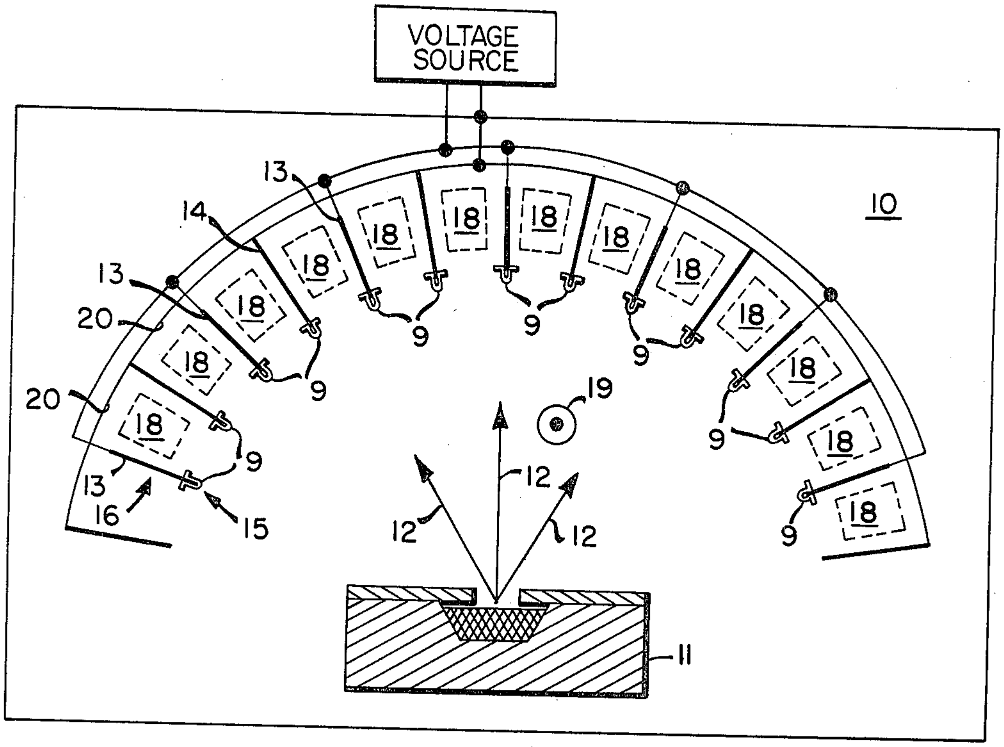
FIG. 1 is a schematic cross sectional view of a preferred ion separation apparatus employing collection shields in accordance with the invention.

Referring to the drawings, FIG. 1 is a schematic cross section of a preferred ion separation apparatus employing vapor collection shields 9 in accordance with the invention.

In essence, the ion separation apparatus comprises, disposed within a vacuum chamber 10, a source 11 of neutral particles of an isotopic mixture such as a mixture of uranium 235 and uranium 238. Preferably the source emits such neutral particles as streams of vapor moving in generally defined paths indicated by arrows 12. Disposed in the paths of particle emission are a plurality of spaced apart ion separation electrodes comprising positive electrodes 13 and negative electrodes 14. Preferably the electrodes have respective elongated, narrow-width surfaces 15 (leading edges) oriented substantially perpendicular to the paths of vapor emission and large area surfaces 16 substantially parallel to such direction. Opposing positive and negative electrodes define between them an ionization region wherein isotopically selective ionization means such as laser beams 18 can act on the neutral particles to ionize some of the particles passing therethrough, and thereby to produce a plasma in the region.

To separate the ions thus produced from the remaining neutral particles in the plasma, voltage pulses are applied between electrodes 13 and 14. These pulses, in combination with a DC field 19 from a magnet (not shown) produce crossed electrical and magnetic fields which drive the selectively ionized particles onto the negative electrodes 14 where they deposit for subsequent removal and processing. The non-ionized depleted neutral particles continue through the region substantially unaffected by the fields around them and deposit on tailings plates 20.

The structure and operation of the vapor source, magnet and electrodes are described in greater detail in U.S. Pat. No. 3,939,354 issued to George S. Jones on Feb. 17, 1976, which is incorporated herein by reference.

Figure 2:
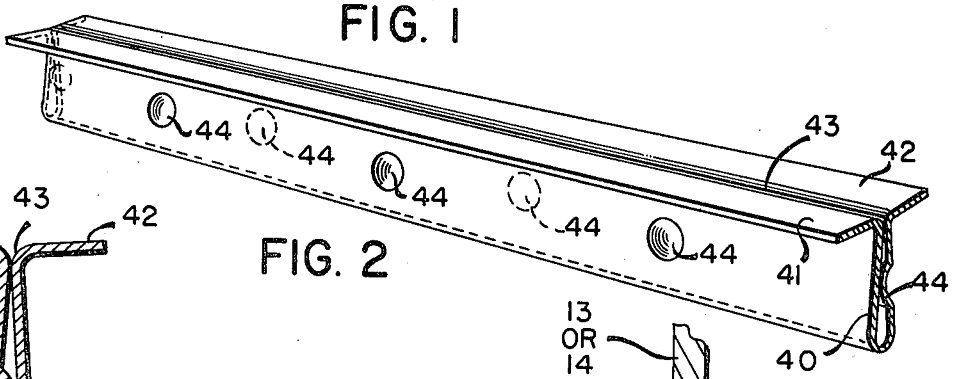
FIG. 2 is a perspective view of a collection shield for use in the embodiment of FIG. 1.
Figure 3A:
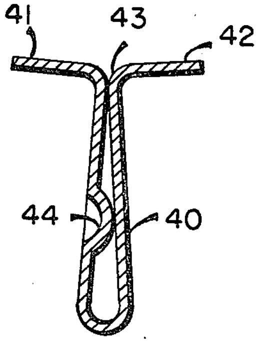
FIGS. 3A, 3B and 3C are cross sectional views illustrating the preferred cross sectional shape of the shield of FIG. 2 in non-engaged, engaged, and operating configurations respectively.
Figure 3B:
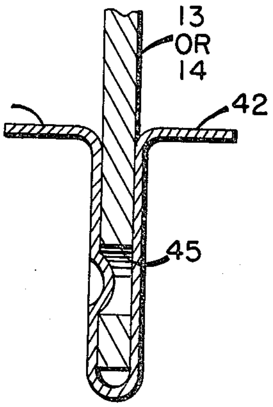

Collection shields 9, shown in greater detail in FIGS. 2 and 3, are elongated members for removably engaging respective ion separation electrodes 13 and 14 and collecting the neutral particles which would normally either pass through the ionization region unexposed by laser beam 18 or impinge upon the narrow surfaces of the electrodes. As can be seen by reference to FIG. 2, the preferred shield is an elongated member having, in cross section, a generally U-shaped clipping section 40 and a pair of generally transverse flanges 41 and 42 on opposite sides of the "U". The ends of the "U" are preferably bent towards one another in order to produce a constricted portion 43 that can resiliently engage the leading edge of an electrode. As best illustrated in FIG. 3B, the clipping portion is preferably provided with a plurality of dimpled regions 44 along its length in order to engage with appropriately spaced and dimensioned apertures 45 in the electrode. Advantageously the dimples are alternately formed on opposite sides of the clipping region along the length of the shield.

In use, transverse flanges 41 and 42 project substantially perpendicular to both the electrode and the vapor flow path to an extent sufficient to collect the bulk of the vapor that would normally pass between the electrodes unexposed by beam 18.

In a preferred embodiment the shield is made of a material such as titanium or molybdenum which does not readily form a eutectic with uranium at a temperature below about 1000° C.

Figure 3C:
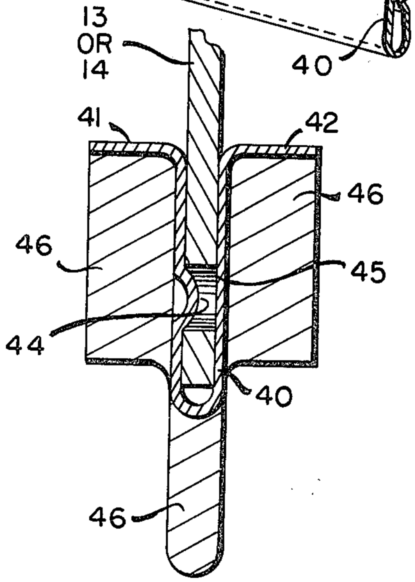

As shown in FIG. 3C, in operation the collector shield accumulates a metallic deposit 46 of uranium vapor evenly in a "T-shaped" configuration which is highly resistant to bowing due to differential thermal expansion. This uranium, which is richer than vapor reaching the tailings plate but less rich than the ions reaching the product electrode, can be readily recovered for further processing by removing the collector shield from the electrode. The separate collection of this vapor preserves its level of enrichment without deteriorating the level of enrichment of the product electrode.

While the invention has been described in connection with a small number of specific embodiments, it is understood that these embodiments are merely illustrative of the many possible specific embodiments which can represent applications of the principles of the invention. Numerous and varied systems can be made by those skilled in the art without departing from the spirit and scope of the invention.

What is claimed is:

1. An apparatus for separating an isotopic mixture of the type comprising (a) source means for emitting neutral particles of said isotopic mixture, (b) a plurality of spaced apart electrode means disposed in the path of particle emission; (c) in a region between spaced apart electrodes a radiation beam for isotopically selectively ionizing at least some of said neutral particles, said beam occupying less than all of said region, and (d) means for separating said ionized particles from said neutral particles, the improvement comprising:

at least one collection shield removably engaged to at least one respective electrode having at least one surface projecting from said electrode for collecting those neutral particles from said source which would otherwise pass between electrodes without passing through said beam.

2. Apparatus according to claim 1 wherein said means for separating said ionized particles from said neutral particles comprises means for applying a voltage differential between respective ones of said electrodes.

3. Apparatus according to claims 1 or 2 wherein said collection shield comprises a generally U-shaped clipping portion for clipping onto said electrode and a pair of substantially transverse flanges at opposite sides of the clipping portion.

4. Apparatus according to claim 2 wherein said at least one electrode comprises a conductive body having an elongated leading edge of relatively narrow width substantially perpendicular to the path of particle emission and a relatively large area surface substantially parallel to said path.

5. Apparatus according to claim 4 wherein said collection shield comprises a generally U-shaped clipping portion for clipping onto the leading edge of said electrode and said at least one surface projecting from said electrode comprises a pair of flanges projecting substantially transversely from said electrode at opposite sides of said clipping portion.

6. Apparatus according to claim 5 wherein said clipping portion is resiliently biased toward a closed position for resiliently engaging said electrode.

7. Apparatus according to claim 5 wherein said electrode comprises a plurality of apertures along its length and said shield comprises a plurality of inwardly directed dimpled regions spaced and dimensioned for engaging said apertures.

8. Apparatus according to claim 5 wherein said collection shield is comprised of titanium or molybdenum.

* * * * *